June 22, 1948. B. F. ARPS 2,443,884
SCOOP ATTACHMENT FOR TRACTORS
Filed Jan. 9, 1946 3 Sheets-Sheet 1

INVENTOR.
BRUNO F. ARPS
BY  A. S. Krob
ATTORNEY

June 22, 1948.　　　B. F. ARPS　　　2,443,884
SCOOP ATTACHMENT FOR TRACTORS
Filed Jan. 9, 1946　　　3 Sheets-Sheet 2
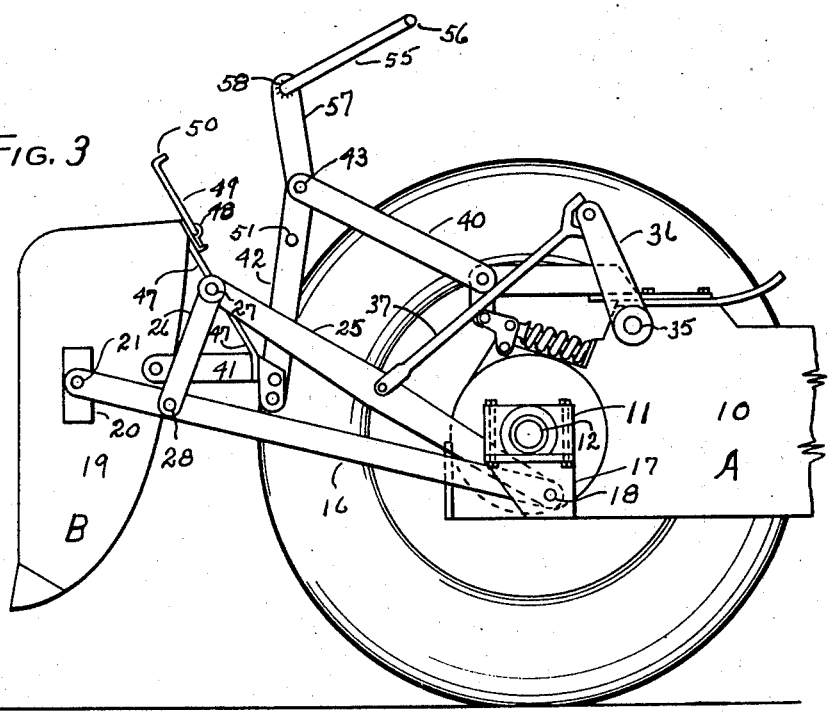
FIG. 3
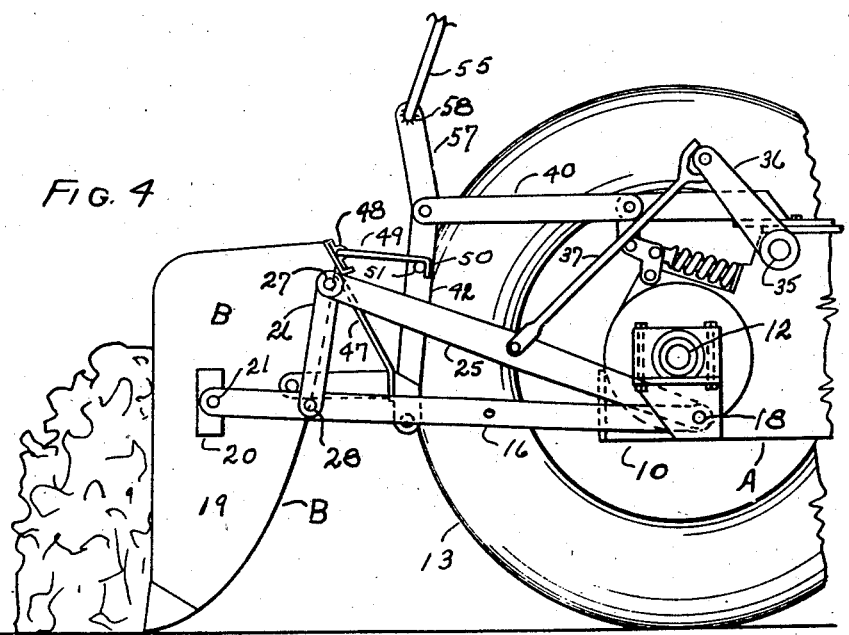
FIG. 4
INVENTOR.
BRUNO F. ARPS
BY 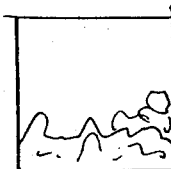
ATTORNEY

Patented June 22, 1948

2,443,884

UNITED STATES PATENT OFFICE 2,443,884

SCOOP ATTACHMENT FOR TRACTORS

Bruno F. Arps, New Holstein, Wis.

Application January 9, 1946, Serial No. 639,918

8 Claims. (Cl. 37—126)

The present invention relates to dump scoop attachments for tractors, the tractor having a power lift and means whereby the scoop may also be used as a dirt moving means, bulldozer-like for filling trenches, etc.

An object of the present invention is to provide a simple, light and strong dump scoop for tractors but having additional means whereby the scoop may be locked in its dumping position so the bottom of the scoop points rearwardly and can be used for pushing dirt bulldozer fashion into the trench when it is impossible to dump the dirt in the trench directly from the scoop.

A still further object of the present invention is to provide supplemental bars attached at their rear ends to the drawbars and at their front ends to the tractor a distance inwardly from the drawbar connection to the tractor, thus to provide a more convenient link connection from the power lift arms to the drawbars.

It is an object of the present invention to provide a dump scoop of the character which may be made entirely of sheet metal or bar stock in a manner whereby the scoop attachment may be manufactured at extremely low cost and without expensive factory equipment.

To these and other useful ends my invention consists of parts, combination of parts or their equivalents and mode of operation as hereinafter described and claimed and shown in the accompanying drawings in which:

Fig. 3 is a view similar to Figure 2 except after the scoop has been dumped.

Fig. 4 is a view similar to Figure 3 except with the scoop lowered to a position so it may be used for moving dirt bulldozer fashion.

Figure 1:
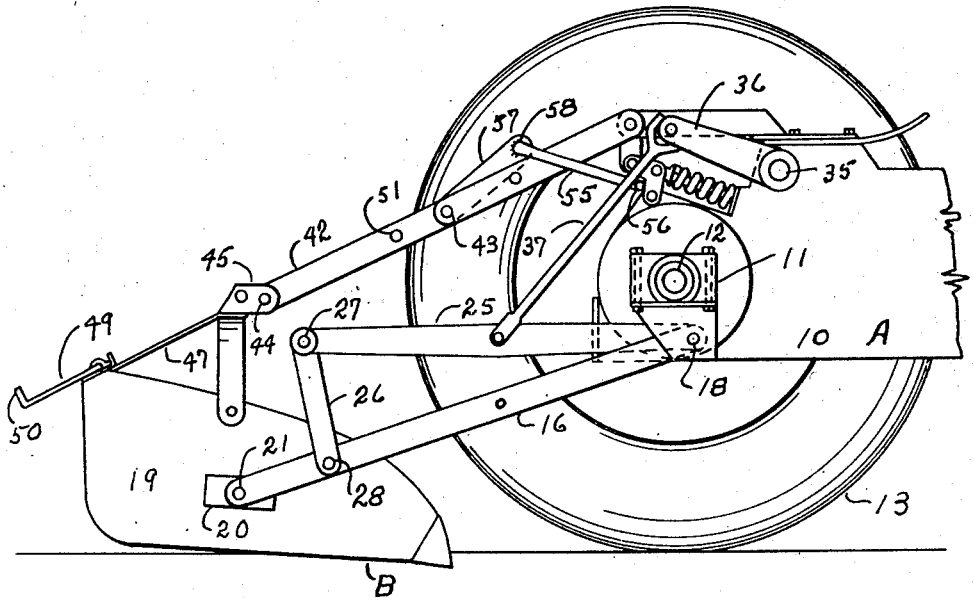
Fig. 1 is a side elevational view of my device as attached to a conventional tractor and being in a loading position.

As thus illustrated the tractor fractionally is designated by reference character A and the scoop in its entirety is designated by reference character B. The frame of the tractor is designated by reference character 10 having outwardly projecting axle housings 11—11 in which the axles 12 are rotatably mounted, the inner ends of the axles being operatively connected to a conventional differential (not shown). Ground wheels 13—13 are secured to the outer ends of axles 12.

In Figures 1, 2, 3 and 4, the near ground wheels 13 are omitted so as to more clearly illustrate many of the operating parts of the device. I provide spaced apart drawbars 16—16, their forward ends being preferably hingedly connected to axle housings 11 as at 18.

Figure 5:
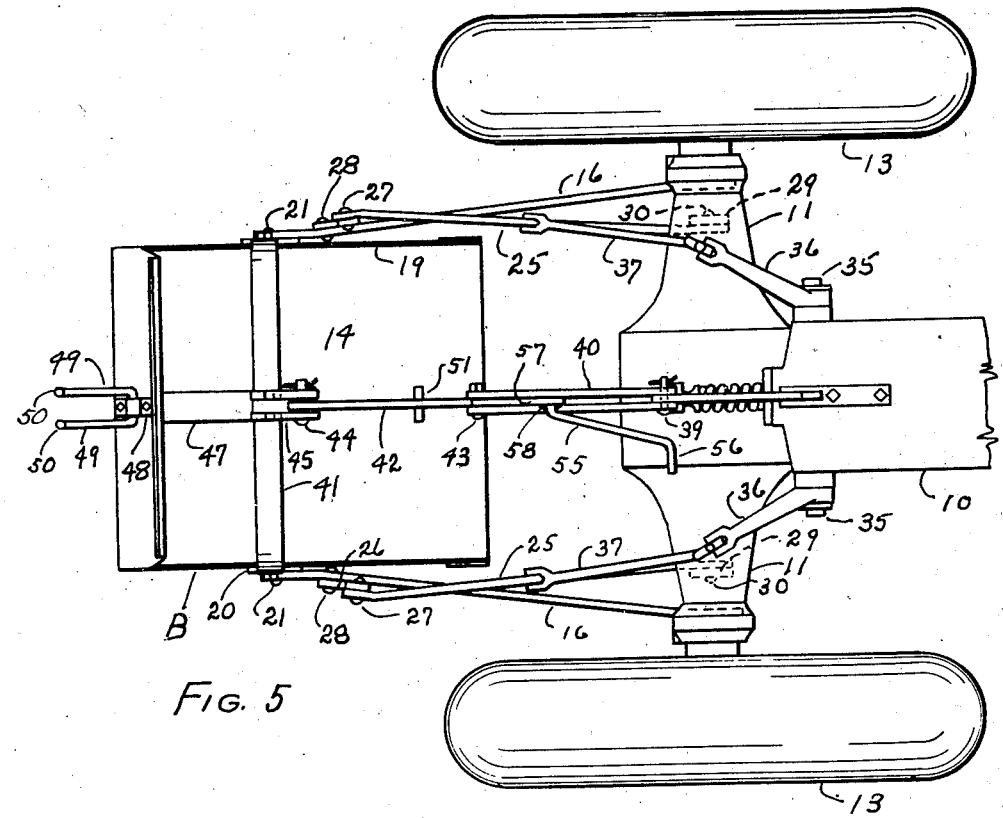
Fig. 5 is a top view of my device as illustrated in Figure 1.

Drawbars 16 converge rearwardly (see Figure 5). On the side plates 19—19 of scoop B I secure strengthening plates 20—20 to which the rear ends of drawbars 16 are pivotally secured as at 21—21. The bottom and rear end wall of the scoop is designated by reference character 14.

I provide supplemental bars 25—25 which are at their rear ends connected to drawbars 16 by means of links 26—26 as at 27—27 and 28—28.

The forward ends of members 25 are pivoted to brackets 29—29 as at 30—30. Brackets 29 it will be noted depend from housing 11 and pivot points 30 being preferably in transverse alignment with pivot points 18.

Within the upper rear corner of housing A there is provided a hydraulic cylinder having a piston with a connection to a transverse shaft 35 on the ends of which are secured arms 36—36, the rear or free ends of these arms having connections to members 25 by means of links 37—37, whereby the scoop may be raised and lowered.

In tractors of the class there is provided a hydraulic pump having a connection to the hydraulic cylinder (not shown) by means of a control box with a manually operated lever whereby by moving the lever in one direction the scoop may be lifted and by moving the lever in the other direction the scoop may be lowered in a manner too well known to require illustration or description.

I provide a link 40 which is pivoted at its forward end to the upper rear corner of the tractor frame 10 preferably as at 39 in any well known manner. In members 19 I secure an inverted U-shaped bracket 41 and pivotally connect the upper end of this bracket to link 40 by means of another link 42 as at 43 and 44. Members 40 and 42 are positioned centrally transversely and pivot 44 is secured to the central portion of member 41 by means of a bracket 45. This bracket has two or more openings for the reception of pivot bolt 44 so the down suck of member B may be adjusted. I provide a brace 47 to which members 41 and 45 are secured, the rear end of this brace being secured to the upper rear corner of member B.

I secure a bracket 48 either to member 41 or directly to the upper rear corner of member B and rotatably mount in this bracket preferably a U-shaped member 49 having hooks 50. A pin 51 is secured to member 42 about in the position shown so that when the scraper is in the position shown in Figure 4, member 49 may be moved so hooks 50 will engage the forward side of pin 51, thus to hold the scoop in the position shown in Figure 4 when used for moving dirt bulldozer fashion.

Figure 2:
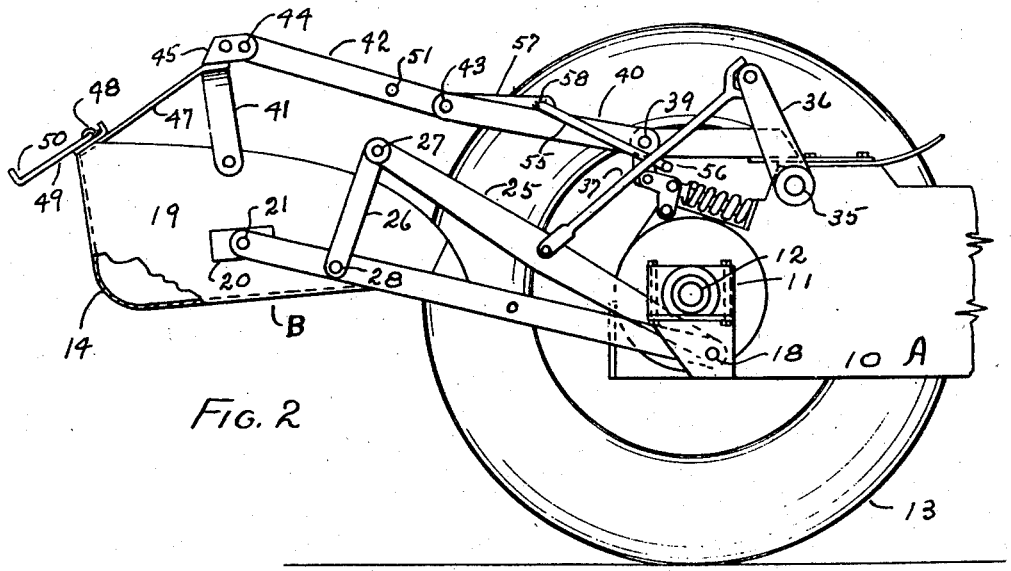
Fig. 2 is a view similar to Figure 1 except the scoop is shown in a raised position.

Thus I have provided a simple and efficient dump scoop for attachment to a tractor having a power lift and means whereby the scoop may be locked in its extreme dump position for use as illustrated in Figure 4. In the figures (1 through 5) I illustrate a hand lever 55 having at its forward end a hand grip 56 and being at its rear end secured to a forward extension 57 on member 42 as at 58, extension 57 being shaped preferably so the rear end of member 55 will lie on member 40 when pivot 43 is in line with pivots 39 and 44 or slightly below these pivots so the toggle joint as shown in Figures 1 and 2 is locked against pressure or for example a pin as shown may be provided on which member 57 may rest. When the operator desires to dump the scoop all that is necessary is to lift on member 56 so as to raise pivot 43 above the plane of pivots 39 and 44, after which the scoop will be dumped automatically because of the position of pivots 21.

Clearly members 25 and 26 may be dispensed with and links 37 provided with a direct pivotal connection to drawbars 16.

In the figures members 25, 26 and 27 are provided for the purpose of reaching arms 36 with links 37 without resorting to a difficult angle of members 36 and 37 and for stabilizing the scoop against transverse swinging.

Clearly many minor detailed changes may be made in the design shown without departing from the spirit and scope of my invention as recited in the appended claims.

Having thus shown and described my invention, I claim:

1. In combination with a tractor having a power lift comprising, a scoop, drawbars hinged at their front ends to the rear ends of the tractor and at their rear ends to the side walls of said scoop, an inverted U-shaped yoke, its ends being secured to the side walls of the scoop and its center portion being secured to the upper rear corner of the scoop, a toggle joint hingedly connected at its rear end to the transverse center of said U-shaped member, and at its forward end to the upper rear corner of the tractor, stopping means whereby the center of said toggle joint is limited in its downward movement to a locked position against pressure and means whereby its center portion may be raised manually to permit the scoop to dump its load, the hydraulic lift of said tractor having a transverse shaft, the ends of which protrude on opposite sides of the tractor frame, levers secured to said protruding shaft ends, links forming operating connections between the free ends of said levers and drawbars, whereby said scoop may be raised and lowered hydraulically.

2. A device as recited in claim 1 including, means at one end of said toggle joint whereby the down suck when the scoop is in its loading position, may be adjusted.

3. A device as recited in claim 1 including, an element having one end pivoted to the upper rear corner of the scoop, the other end having a hook, hook engaging means on the rear link of said toggle joint, whereby when the scoop is dumped it may be locked into position and used for moving dirt bull-dozer fashion.

4. In combination with a tractor having a power lift comprising, a scoop, drawbars hinged at their front ends to the rear ends of the tractor and converging rearwardly, their rear ends being hinged to the side walls of the scoop, an inverted U-shaped yoke, its ends being secured to the side walls of the scoop and its center being secured to the upper rear corner of the scoop, a toggle joint hingedly connected at its rear end to the transverse center of said U-shaped member, and at its forward end to the upper rear corner of the tractor, stopping means whereby the center of said toggle joint is limited in its downward movement to a locked position against pressure and means whereby its center portion may be lifted manually to permit the scoop to dump its load, supplemental bars hinged at their forward ends to the tractor a distance inward from the forward ends of said drawbars, said supplemental bars diverging rearwardly and having an operating connection at their rear ends to said drawbars, the hydraulic lift of said tractor having a transverse shaft, the ends of which protrude on opposite sides of said tractor frame, levers secured to said protruding shaft ends, links forming operating connections between the free ends of said levers and said supplemental bars whereby said scoop may be raised and lowered hydraulically.

5. A device as recited in claim 4 including, means at one end of said toggle joint whereby the down suck when the scoop is in its loading position may be adjusted.

6. A device as recited in claim 4 including, locking means mounted on the upper rear corner of said scoop, engaging means on the rear member of said toggle joint, said locking means adapted to be manually engaged and disengaged with said engaging means, whereby when the scoop is in a dumped position it may be used for moving dirt bulldozer fashion.

7. In combination with a tractor having a power lift, a scoop, draw bars hinged at their front ends to the rear end of the tractor and at their rear ends to the side walls of the scoop, anchoring means secured to the side walls and top of the end wall of the scoop, its center portion being connected to the tractor by means of a toggle joint, stopping means whereby the hinge of the toggle joint is limited in its downward movement to a locked position against pressure, means whereby the center portion of the toggle joint may be raised manually to permit the scoop to dump its load, the hydraulic lift of said tractor having a transverse shaft the ends of which protrude on opposite sides of the tractor frame, levers secured to said protruding shaft ends, links forming operating connections between the free ends of said levers and the draw bars intermediate the ends of the draw bars, whereby said scoop may be raised and lowered hydraulically and dumped manually.

8. A device as recited in claim 7 including, an element having one end pivoted to the upper rear end of the scoop, its other end having a hook, a hook engaging means on the rear link of said toggle joint, whereby when the scoop is dumped the hook of said element may be caused to engage the hook engaging means, and lock the scoop in its dumping position for use in moving dirt bulldozer fashion.

BRUNO F. ARPS.